US008866673B2

(12) United States Patent
Mendelson

(10) Patent No.: US 8,866,673 B2
(45) Date of Patent: Oct. 21, 2014

(54) SYSTEM AND METHOD FOR PROVIDING INDOOR NAVIGATION AND SPECIAL LOCAL BASE SERVICE APPLICATION FOR MALLS STORES SHOPPING CENTERS AND BUILDINGS UTILIZE RF BEACONS

(76) Inventor: Ehud Mendelson, Coral Springs, FL (US)

( * ) Notice: Subject to any disclaimer, the term of this patent is extended or adjusted under 35 U.S.C. 154(b) by 622 days.

(21) Appl. No.: 12/587,042

(22) Filed: Oct. 1, 2009

(65) Prior Publication Data

US 2010/0121567 A1 May 13, 2010

Related U.S. Application Data

(62) Division of application No. 11/429,864, filed on May 8, 2006, now Pat. No. 8,836,580.

(60) Provisional application No. 60/678,947, filed on May 9, 2005.

(51) Int. Cl.
| | |
|---|---|
| *G01S 1/02* | (2010.01) |
| *G01S 1/08* | (2006.01) |
| *G01S 3/02* | (2006.01) |
| *G01S 1/68* | (2006.01) |
| *G01C 21/20* | (2006.01) |
| *G01S 5/02* | (2010.01) |
| *G06Q 30/02* | (2012.01) |
| *G06Q 90/00* | (2006.01) |

(52) U.S. Cl.
CPC ............... *G01S 1/68* (2013.01); *G01C 21/206* (2013.01); *G01S 5/02* (2013.01); *G01S 5/0226* (2013.01); *G06Q 30/0239* (2013.01); *G06Q 90/20* (2013.01)
USPC ............ 342/386; 342/450; 342/465; 701/467

(58) Field of Classification Search
USPC ................ 342/357.25, 386, 457, 463, 450, 342/357.21, 357.71, 465; 701/467, 468; 705/323
See application file for complete search history.

(56) References Cited

U.S. PATENT DOCUMENTS

| | | | | |
|---|---|---|---|---|
| 5,798,733 A | * | 8/1998 | Ethridge | 342/357.34 |
| 7,031,875 B2 | * | 4/2006 | Ellenby et al. | 702/150 |
| 2006/0122767 A1 | * | 6/2006 | Athalye | 701/200 |
| 2006/0163349 A1 | * | 7/2006 | Neugebauer | 235/383 |
| 2006/0253226 A1 | * | 11/2006 | Mendelson | 701/1 |
| 2008/0227473 A1 | * | 9/2008 | Haney | 455/457 |

* cited by examiner

*Primary Examiner* — Dao Phan
(74) *Attorney, Agent, or Firm* — Allen D. Hertz, P.A.; Allen D. Hertz

(57) ABSTRACT

The system and method described herein could guide people around urban environments indoor and outdoor, provide a direct content according to the user preference/profile and navigation guidance to the content integrated into a special local base services application benefit mall store or building facility area. The content and navigation will display on the existing cellular phone as mobile application.

20 Claims, 12 Drawing Sheets

FIG. 4  Secure User Preferences/profile

FIG. 11
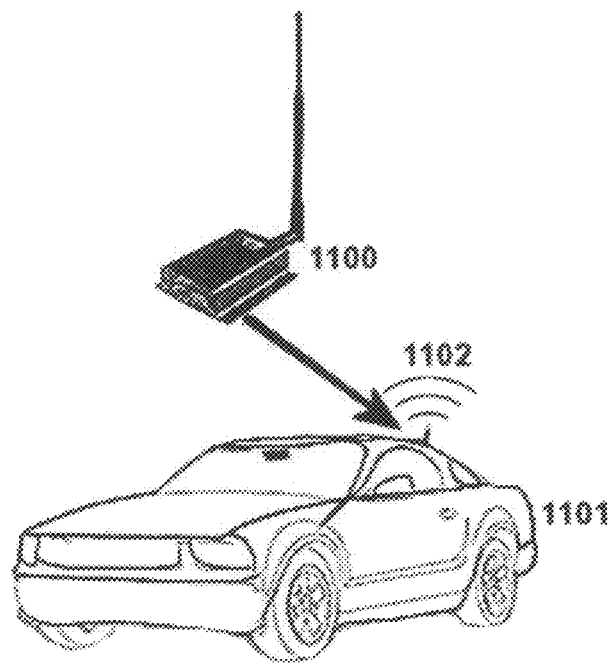
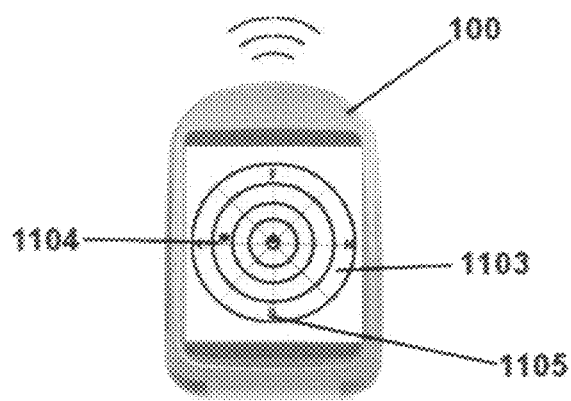

SYSTEM AND METHOD FOR PROVIDING INDOOR NAVIGATION AND SPECIAL LOCAL BASE SERVICE APPLICATION FOR MALLS STORES SHOPPING CENTERS AND BUILDINGS UTILIZE RF BEACONS

RELATED APPLICATIONS

This application is a Divisional Application of U.S. patent application Ser. No. 11/429,864 Filed May 8, 2006, now U.S. Pat. No. 8,836,580 that claims the benefit of U.S. Provisional Patent Application 60/678,947, filed May 9, 2005.

FIELD OF THE INVENTION

This invention is directed generally to the field of navigation and, more particularly, to such method to be used indoors or outdoors in a mall store buildings department store and to provide local based services directly to the user navigation or cell phone.

BACKGROUND OF THE INVENTION

The Scope of the Present Invention:

A great deficiency in the technology available for local businesses has been identified. Location Based Services (LBS) represent a huge advertising and mapping market—estimated at over $150 billion a year. It represents a big opportunity in the navigation market that has not been explored yet.

Existing System and Industry Trends:

Local mapping today is mostly paper: Mall maps, store maps, mapping of department stores, commercial buildings, hospitals, schools, campuses, municipalities, shopping centers, down town districts, indoor facilities, building maps, parking areas, parking garages, amusements parks, subway systems, transit maps, museum maps, area attractions maps, hotel and resort maps and even more importantly the emergency maps and procedures posted in buildings.

Factors in Local Mapping:

Local maps can be of either indoor or outdoor locations.

Local maps are available on paper, on the web and, in some cases, on a kiosk within the facility.

A high degree of accuracy is needed in order to provide usable maps for navigation indoors—less than 10 meters—to a store or even a parking space.

Global Positioning Systems (GPS) cannot provide acceptably accurate mapping, as it is only accurate to within 100-200 feet. This is one reason that the GPS industry does not provide this type of mapping. The same is true for cellular network providers, as the accuracy is also 100-300 feet, and then only when the signal is available. Signal availability is often a problem indoors and also when it is most needed—in an emergency situation when most of the cellular network fails due to high demand. Again, this is the reason that there is no local mapping available for cellular users. (Local mapping equates to accuracy in finding a store, room, or parking level within 5 meters.)

At this time there is no indoor navigation solution. The most recent technology provides access to a user's location through a combination of group "social networking" and a "buddy list".

Most technology available today attempts to "locate" a moving "user" in an area, the present invention reverses that idea and let the "user" navigate the local area on the local maps.

Indoor navigation vs. Outdoor navigation: Pedestrian navigation is more than locating and navigating, most likely they are at or near their destination already. There are two possibilities, either they are in unknown surroundings and their task will be to explore the surrounding or they are looking for a specific product—their defined goal is like buying a new pair of shoes or getting a book or just going to shop around, exploring a new location, new deals, sales specials, or simply sightseeing.

The theory is based on the belief that "you are what you do" meaning—the service, special sales, coupons discount, or any other deals. They are the key!

The main task of indoor navigation is to show the user where the specials, sales, and coupons and direct-navigate the user to them. The integration of multimodal journey planning and guidance to dynamic waypoints, Sales, specials etc. Complex public interchange facilities are not adequately addressed by existing systems.

In some aspects, indoor navigation looks simpler than outdoor navigation. For instance, the geographical area covered is much smaller and the expected speed of travel—walking—is much lower. However, other aspects make indoor navigation much more challenging. First among these is the unsuitability of GPS and related technologies. Second is that in a complex indoor environment the requirements are more stringent. For example, vertical positioning of the topology and the need for accuracy less than 10 meters—to the store, the product, and even to the aisle or the parking space—cannot be achieved with todays existing system.

The indoor market represents much greater potential than outdoor navigation, as on average people spend more then 90% of their time indoors.

The Objectives and Goals Behind the Disclosed Concept:

The technology behind the disclosed innovation is quite simple—a direct communication between the user device/cell phone, Bluetooth enabled device and a Bluetooth tags/sensors/beacons installed in a known location in an area/building/store facility, without relying on GPS, centralized servers, Internet bandwidth or even cellular communication—they can be supportive are but not essential.

The main concept is to use existing off-the-shelf technology and devices with a minimal cost of deployment and to provide a simple indoor/pedestrian technology which delivers accuracy with an integrated suite of applications especially designed for the user/shopper indoors.

The System Includes:

Ability to load the local mapping at the facility via Bluetooth from a proximity WAP or ability to pre-load the maps via the web portal prior to arrival at the area. (indoormapping.org).

Ability to have special navigation software either as an add-on to existing navigation on the user's cell phone or existing navigation system (car, mobile) as the associated Bluetooth applications.

Ability to deploy Bluetooth beacons in the local area where the beacon will be a known location—waypoints to provide the infrastructure needed to navigate in the area. A very low cost and fast deployment beacon system.

Ability to use the log of the "user" Bluetooth ID or the Bluetooth naming ext. as a key (NOT THE CELLULAR NUMBER) for future marketing purposes or for emergency use. This aggregation of data will be invaluable to retailers, etc. Bluetooth enabled cell phones or old Bluetooth headphone can be used as beacons (potentially a good use for millions of old cellular phones).

System Segments:

The beacons—Parts of the disclosed system include Bluetooth tags/beacons installed in known locations in the area/facility and represent "waypoints", store/special sales, places etc.

The scanner detection—Whenever a mobile phone or mobile device with a Bluetooth capacity is switched on and loaded with the disclosed application, it will periodically scan the area for the Bluetooth beacons; proximity to a tag/beacon will determine the "user" location on the area/facility map.

The navigation—Can be plotted between waypoints/store/places on the map

The sale sense—marketing tools—The disclosed system works by passively observing the initial part of the scanning of movement. The disclosed system does not monitor or listen to conversations or text messages. Nor does it transmit or intercept any information or interfere with the mobile network operators in any way. The disclosed system is a scanning detector (not a receiver or transmitter), which can observe the unique Bluetooth ID/key set of the device (not a telephone number or name) and aggregate resultant data.

Example of Scenarios:

A user in a mall can load the mall maps of the mall from a Bluetooth WAP system (which can be inside the mall directory point), directly to a cellular phone via Bluetooth.

A Bluetooth navigation application on the user's mobile phone will scan signals from known locations—Bluetooth beacons and will determine the "user's" location on the local mall map (the same way as a GPS) with accuracy of less then 5-10 m. (More beacons with LESS signal range=more accuracy)

The associated assumptions are based on the following facts:

Globally, more "users" carry mobile phones than any other device.

GPS and existing mapping are not accurate enough to handle the local mapping need, particularly indoors where satellite signals are not available.

On average people spend more then 90% of their time indoors.

The Bluetooth is the most used communication method today and it is installed in more than 85% of all new cellular phones. (less then 5% are Wi-Fi)

Bluetooth can recognize other Bluetooth devices in the close proximity.

The technology already exists.

The disclosed innovation is based on direct communication scanning the Bluetooth beacons and the "user's" cellular phone without the use of a cellular network or GPS nor Internet or central system.

The available local advertising marketing is huge with over $150 billion in revenue in the US alone.

Indoor LBS Applications:
Nav4Parking
Nav4Realty
Nav4Mall
Nav4Sale
Nav4Museum
Nav4Show
Nav4Train
Nav4Sign
Nav4Emergency
Nav4Conference
Nav4ThemePark
Nav4Event
Return2 Parking This is a concept that offers a complete suite of application from finding parking to navigation of indoor malls\stores and with a capacity to navigate to emergency exits with a low cost to implement and with a business model that can be used to attract customers.

The application represents a big opportunity in the navigation market and will open up new avenues for companies from telephone operators mall store department store owners to navigation and mapping companies.

We present a low cost and easily deployed infrastructure for local based navigation outdoors and indoors without the need for GPS and or cellular networks. Moreover, the concept is especially suitable for local area (indoor and outdoor) services when and where the GPS and the cellular network can't provide the solution and the accuracy needed to provide such navigation (10 M or less).

The disclosed system is based on existing Bluetooth, a technology that is proven to be stable, simple, inexpensive and mature in market use. Moreover, it is a common communication tool and is available on more than 85% of all new mobile phones.

System Architecture:

The infrastructure consists of Bluetooth beacons installed in known locations in a local area. The beacons will respond to Bluetooth device scanning inquiries made by "user's" Bluetooth enabled cellular phone or other Bluetooth device with a an associated program.

The known location of the beacon is set in a small database: the table of the beacon (waypoints=the beacons identities according to the Bluetooth address/name of the beacon) is attached to the local area mapping of the area.

The local area map (mall map, store, building map, area map etc.) will be available to be downloaded via a WAP system at the entrance of the building/mall/area or the directory places to provide the mapping for the navigation, A "user" can also download the mapping from the "indoor-mapping.org" before approaching the place to be navigated. The disclosed system creates an indoor mapping portal—indoormapping.org.

A "user's" Bluetooth cellular phone will scan the local area for the location beacons. When a "user" is within 5/10 meters, the location beacons respond, providing room-level navigation accuracy. With multiple beacons installed and possibly receiving more then one beacon's signal, a simple triangulation calculation and options for signal strength will determine the exact location of the "user" on the downloaded map of the local area.

Other signals not on the database list will be ignored

There is a mixed use of beacons and WAP depending on the application (for example in a mall application, the stores can have a WAP to deliver more content to a "user's" mobile device where the beacons serve as navigation "antennae" and waypoints to help the "user" navigate in the area.

Sales Sense—Next Generation Marketing Tools—the Behavioral Module:

Recent published research showed that on average people spend 90% of their time indoors.

Moreover, according to research, indoor navigation may be more important than outdoor navigation and may represent a huge new market.

The disclosed technology allows shopping centers, malls, department stores, buildings, airports, train stations, exhibition centers, museums, and amusement parks to understand the way that their customers or passengers flow through their premises. At the same time it provides the user/shopper with unique indoor navigation capability without compromising user privacy.

The disclosed innovation will allow, for the first time, the navigation and GPS industry to tap into the local advertising market, estimated to be $134 Billion in the US alone.

The disclosed technology provides a reliable method for identifying the path habits and the behavior that people take through an area.

There are a number of advantages to the disclosed technology including:

Extremely large sample size as mobile penetration is above 90%

Shoppers remain anonymous Accurate to within 5 m Based on a Bluetooth technology For retail areas, malls in particular, the advantages of understanding shopper behavior are significant. Such information can assist the mall to:

Evaluate and improve their retail tenancy mix by identifying which stores shoppers consider complementary
Identify underutilized areas in the mall
Understand the impact of anchor stores on the mall
Measure the implications of particular promotions or center events
Assist with planning day-to-day mall operations
Provide add-ons for the shoppers
Provide shoppers with a "web" like shopping experience
Provide shoppers with incentive/advertising
Increase security
And in an emergency provide the shoppers with alarm and notification The disclosed technology is the only system on the market today that can gather information on shopper paths continuously and accurately without the need for Internet or cellular communication and all without compromising the shopper ID or his privacy.

Over the past 6 years, a unique and innovative system and method has been developed, wherein the system and method can also provide a way of surveying the behavior and preferences of the "user" shopper simply by observing the anonymous signals (encoding Bluetooth naming key+Bluetooth ID) given off by their mobile phones and at the same time provide the shopper with a unique special application for indoor navigation.

People like to think of themselves as offering the next generation approach to the LBS market, especially to indoor applications and to areas where a GPS cannot provide accurate navigation.

The anonymous data that can be collected using the technology can be used to provide trend reports showing which shops are most visited and at what times, whether there are sufficient public facilities to serve the visiting shoppers or whether more security staff are needed to name only a few of the potential benefits. Ultimately, the collected data is understood as helping shopping centers to become more in-tune with their customers so that they can create better, more pleasant places to visit.

The disclosed analytics can turn shopping center/department store/store into finely tuned sites, enabling mall/store owners to direct the flow of traffic efficiently around.

In contrast to alternative techniques, there is no device that tracks the user cell phone. In the disclosed method the user device/cell phone is the one that scans and tracks tags/beacons along the route, each scan includes the cell's unique Bluetooth ID (think IP address), and while these ID'S help track the movement of the signal and it's owner, they don't reveal the identity of the user. This is a more precise method than what GOOGLE maps uses to detect a general location on a mobile phone by cell towers which are accurate between 300-1000 meters compared to the accuracy of the disclosed system which is below 10 meters.

Some reports about shoppers: show how valuable behavioral information actually is, and the profit opportunities that come along with this.

Where they go?
Where they go next?
Where they do what?
When they do what?
Who does what?

Understand behavioral patterns across demographics. Similarities, differences and much more.

Sales Sense User Preference Module

Every day millions of people access the Internet and enter their profile, personal information, or answer questions about their preferences in order to access a service/site, to get incentives, coupons, specials, etc. . . . . . The sites use the information for marketing and in some cases, share or sell the information. Recent research has found that most people are willing to give information for incentives.

Using the profile and records, the surfing habits of the user (IP) is the way that all the search engine companies make money on the Internet. At the same time they try to direct the content to the user according to their profile/habits.

But what about real life? People spend more and more time indoors (according to recent research, people spend more than 90% of their time indoors).

A scenario of searching for store/item, special sales, and coupons according to a person's desire is repeated again and again. The question is how can one transfer the success of Internet marketing tools and the easy search for the real life? That is the main idea behind the disclosed innovation—what if one can take the profile/the user input with them anywhere and not depend on communication at all, no Internet nor cellular communication is required and more importantly without compromising their identity. Moreover, the user is in complete control over their privacy, more than when surfing the Internet!

In the disclosed innovation, using the associated software, the user enters their profile sales preference and they are encoded into the user's cell phone. Bluetooth naming as a key (Sequence of numbers and letters, much like a VIN# in cars), the key takes part of the Bluetooth device address and the user's profile to encode a key.

There is 3 ways in encoding generating the key:
A. Set segment—the segment keys are not unique and helps to setup the user segment only. In that case the key is not unique and sharing the key presents no privacy issue.
B. To generate a unique key—to be used like the Internet IP. Can be use with minimal user exposes or when user are "register" customer and willing to received additional incentive as a store customers
C. Creates a dynamic key and multiplies profile according to location/user preferences.

The profile can include: Gender, age—range and sales preference (interest), and does not include any personal profile. It may be the same as seeing the user and recognizing their gender, age-range, and other preferences just by looking at the user. The user is not revealing any kind of information that most of sites asking for in a registration process and no personal information AKA. Name, address, or telephone number is exposed.

As part of the included suite of LBS applications, the user's phone will scan the area for the tags/beacons. For example—by being proximity close to the directory stand in a mall a decoding of the user key will be processed in order to allow the user preference segments and provide the user with ads, specials, and incentives according to their profile "Your customer is telling you what they want, are you listening?"

The main idea behind this is to provide the user with pin-point content according to their desired preference at the location and also direct/navigate them to the desired location where they can find the store/sales/special/coupons or the information that they are looking for, At the same time there is also a benefit to the sale/mall store owner by getting the next generation's sales tools, getting customers' habits and their sales profile, and able to serve better and accordingly the customers.

The sales sense, user preference module is an add-on to the sales sense marketing where it joins the user behaviors module to create a very unique LBS business and marketing model the analysis of these spatio-temoral data can supply high-level human behavior information valuable to urban planners, local business and the Local Based Services (LBS) marketing.

Mall/Department Store/Store Indoor Applications Part of nav4mall/Store

The disclosed indoor navigation takes a further step to give the user/shopper next generation shopping tools by providing them with the following indoor applications that are part of nav4mall/store.

Map and indoor Navigation—brings the local mall/store map to the digital age, allowing download at the directory stand or pre load from Internet site prior to arriving. Ability to navigate from waypoints to waypoints on the map Directory—brings the store/mall directory to the cell phone Search and Find—store/place/item products that are on the directory—represent waypoints/tags/beacons on the loading maps Sales/specials—discounts, sales, and coupons, that can be added-on or replacement to the mall/store flyer that provides the shoppers at points in the mall/store, it can even direct the user/shopper to the aisle with the products/coupons and directs the shoppers to what they looking for Parking and return2parking—although not directly the same beacons (for the parking the proposed system can use long range beacons whereby in store/mall embodiment, the beacons can be short range) the disclosed service allows the user to find parking spaces and location of parked cars.

Info—the information part can provide information about events, restrooms, ATM location, seating area, Kids playground, fountain, public phones etc.

Emergency—A very important part of the disclosed innovation is the ability to provide the user with a unique alarm and notification to the user without depending on other communication links like cellular phones that are prone to failure in emergencies. The disclosed innovation provides the user with the building/mall/store/place emergency procedure and in emergency will help navigate the user to safety.

Panic—part of nav4emergency allows the user to request being located in an emergency.

Privacy: The system does not collect personal information such as name or phone number. It does, however, record the phone's Bluetooth identification number to build a profile of the user or the use of the phone in the area. It is like surfing the web where a "user's" IP address is recorded for future marketing statistics and surfing habits. (with permission from the user). Also, as part of the encoding key into the Bluetooth device (user profile), as describe in the sale sense part the privacy and security increase to the level where viewing the key broadcast by the Bluetooth device can't revile any user Identity unless the user request to be register to get incentive special sales etc., even then his name or other personal Identity are secure and only the Bluetooth device key/ID are record.

The associated marketing: By directly targeting the consumer standing right outside a business, an event, or walking toward a kiosk or restaurant, merchants can maximize their marketing budget while incorporating a new, inexpensive and effective form of advertising.

The "user" is in complete control. They can disable their Bluetooth application any time or just reject content, there is no "spam" effect and the "user" is attracted by incentives rather than generic promotions. In a mall like environment a "user's" incentive to use the disclosed innovation can be further enhanced with the use of the key advantages and packages.

Isn't this all a bit like "big brother"? Not at all, and it isn't even "little brother"! All the system does is log the movement of a phone around an area and aggregate this to provide trend data for businesses. It's much less intrusive or invasive than existing methods that are already in widespread use—for instance CCTV cameras and number plate monitoring as they do collect personal information such as your image or car number plate. The disclosed innovation represents the next generation shopping experience in shopping centers, malls or stores and fits very well with today's business model. Such a service can be offered for free to the "users" and backed by advertising and the use of the data by the stores. Such service and application and the ability to include the full "suite" of applications especially designed for shopping malls/stores and include the emergency part of it will also ease the fear of "locating" or any other privacy issue.

Who benefits from the disclosed technology? Everyone benefits from the trend data collected—it's a way to collect instant feedback from shoppers without having to bother them for information. In the old days centers would have used researchers to survey consumers but this information takes time to collate and response rates are very low these days, as shoppers have increasingly become reluctant to stop and share their feedback. Hence the disclosed innovation provides a very effective method in the same way that TV networks know how many people watched particular programs and use that information to discern what programs to make and how to calculate the costs advertisers must pay to promote their products during different timeslots, the system provides the equivalent for shopping center owners and their resident retailers. It is believed that introducing the disclosed system and the marketing tools above can help the users and the sellers upgrade the real shopping experience of today with the advantage of the web like tools.

The disclosed innovation represents the next generation shopping experience in shopping centers and malls and fits very well with today's business model. Such a service can be offered for free to the "users" and backed by advertising and the use of the data by the stores. Such service and application and the ability to include, the emergency part of it will also ease the fear of "locating" or any privacy issue.

For the first time the shopper will experience Internet type marketing in the traditional sales and advertising venue.

Here are the benefits consumers could see from shopping center using the disclosed Technology:
  A. Better in-mall events—the disclosed system can monitor how successful they were by monitoring the sheer volumes of people attending and for how long.
  B. Provide shoppers with next generation sales tools: navigation in your mall store facility directly to the sales or specials that you want them to go to.

C. Add-on to the store/mall directory and the in-store mall flyer.
D. Take the guessing from the customer's next want; and then send them directly to the products coupons special they might want.
E. Improved public transport links—by monitoring how people traveled to a centre. With the government's current emphasis on helping people to use public transport more effectively, having this kind of information can have a very positive, local environmental impact. Busy shopping center can otherwise create large volumes of extra road traffic, also with the disclosed search4parking and return2parking application can improve traffic, saving time and gas.
F. Eliminate congestion within the shopping centre—our innovation can help centre management understand whether opening hours need to be extended or whether the centre layout needs to be improved to avoid congestion.
G. Improve shopping center and public facilities efficient—our innovation's data helps managers to understand which parts of their facility are very busy which means they know when to deploy extra employee/cleaners/security to ensure proper service.
H. Better security—over-crowding also leaves shoppers vulnerable to pickpockets and other security risks. The disclosed system can identify congested areas and ensure security personnel are deployed appropriately. And in the disclosed emergency system can provide instant alarm and notification even if the cellular communication or other system is not available.
I. Improved mix of stores and centre layout—the system helps identify which stores are popular and which are not—making sure that the best possible layout and mix of shops is provided for visiting shoppers. If some shops are unpopular they can be switched for brands that customers actually want.

Altogether this makes for a much better shopping experience.

We believe shopping should be an enjoyable pastime. Who wants to go to shopping center that are congested, poorly laid out, have dirty toilets, are badly positioned for transport links and which pose a security threat to visitors?

How do shopping centre owners and retailers benefit? The benefits for shopping centre owners of using the disclosed technology are huge and there are many possible uses for the information gathered. The system can help shopping center owners get a better understanding of how people use their center such as the order of stores they visit and the time they spend in different areas of the centre.

These days, visits to shopping malls are falling with increased competition from supermarkets, retail parks and the Internet. With visit frequency going down it is critical that the shopper experience at the mall is exceptional and that is where the disclosed system comes in. The information can assists malls at all levels, from the very mundane to the more strategic questions that they face—such as whether or not they have the right mix of retailers across the mall.

Similarly it could help museums identify their most popular exhibits and help exhibition companies plan their venues more carefully around visitor traffic flows.

We are able to provide center with quantitative feedback on whether the changes they make in the mall are successful. One of the ways to do this is by looking simply at how long shoppers tend to stay within a mall.

Don't retailers already measure shopper numbers? Yes they have infrared cameras and counting machines that monitor and count the numbers of visitors to their stores. This measure is known as "footfall" and has been used by retailers for many years. The disclosed system provides another level of data by looking at the aggregate paths that mobile phone carrying visitors take and the length of time they spend—known as "dwell time".

In the past malls have focused solely on looking at the numbers of shoppers that they are drawing through the doors (footfall) but when combined with dwell time, they can get a much more accurate predictor of their performance.

The system has no idea who you are as an individual, as the system only looks at the path their phone takes—it's like looking at a dot moving around a screen. In isolation this information isn't too interesting until one looks at the wider patterns and trends and see lots of dots taking the same route or visiting the same areas of the mall.

What is the Bluetooth ID number? A Bluetooth ID is like the IP number in a computer network or the Internet which does not contain or reveal your phone number—that the network operator uses to identify your phone. The system uses part of the information as a key to calculate anonymous shopper paths.

The linkage between this identifier and your personal information is not publicly available. The system does not use or have an interest in this information and it would be a breach of the data protection act for us (or anyone else) to get that information without your permission. The system considers the Bluetooth key/ID to be just like the Internet IP address that you get assigned each time you log on to the Internet. It contains no more information than an Internet address. In fact this analogy is very helpful in explaining how the disclosed system works in more detail—as the following point explains.

We do not detect any personal information and have absolutely no idea who you are as an individual. Although the system has an option for users to register as mall/store customers to provide more details about you (still no real ID), like a membership cards that will be provide the user with incentive, coupons or special discounts if participate. More over recent emergency events prove the need for emergency and notification to the "right people" at the "right time", by keeping the key/ID of the Bluetooth devices that are in the area/facility—nav4emergency can provide instant alarming and notification and navigation to the exit route and to safety all without reviling user ID or breaching privacy of the users.

The business model—Next Generation Marketing: The web advertising and the main focus of search engine success is based on technology that tracks the web user's habits and provides him with related ads according to his interests.

Using the disclosed infrastructure of a Bluetooth beacons—In a mall, store or shopping center environment the disclosed innovation, will represent a very unique ability to bring a web like shopping experience by its ability to keep up on the "user's" "surfing" or shopping habits in the shopping center, mall, or store. It will provide a better shopping experience (coupons, specials sales, according to the user's shopping habits) and service to the shopper.

Even though it may look like a privacy issue, the add-on services, the application, and the idea that it may save the user's life (nav4emergency application) combined, with the fact that it does not reveal the person's name or telephone number, it is the same as the everyday use of surfing the internet when the user's IP is recorded by the web sites and provides the basis for the "ad sense" or the web marketing tools, it is referred to as "sale-sense".

We believe that introducing the disclosed system and the marketing tools above can help the users and the sellers to upgrade the real shopping experience of today with the advantage of the web like tools.

The disclosed innovation represents the next generation shopping experience in shopping centers, malls and fits very well with today's business model. Such a service can be offered for free to the "users" and backed by advertising and the use of the data by the stores. Such service and application and the ability to include the emergency part of it will also ease the fear of "locating" or any privacy issue.

For the first time the shopper will experience Internet type marketing in the traditional sales and advertising venue.

The disclosed innovation provides valuable solutions that enhance the effectiveness of ad campaigns. The ability to optimize performance in real time has a positive effect on advertiser satisfaction. The fact that this service is well integrated into the disclosed system is a tremendous advantage.

The disclosed innovation is a performance-enhancing technology, providing great data and allowing improved customer service.

It can be an extremely effective way to optimize the performance of offline/online advertising campaigns in the mall/store environment. For excellence in client services the idea is a clear win-win for everyone.

Helping to understand where users are going in the mall/store in real life and their buying behavior patterns will allow the merchants to continually adjust offers, placements and creative content to improve buy-through and maximize sales.

We will evolve the mobile content into a bonfire revenue center that will benefit the shopping mall operator and merchants alike.

The "user" is in complete control. He can disable his Bluetooth application any time or just reject content, there is no "spam" effect and the "user" is attracted by incentives rather than generic promotions.

Probably the best technical analogy would be to compare the disclosed technology with existing web-based systems that measure viewers of web sites, for example GOOGLE Analytics.

These systems work by embedding tags within each page of the web site being measured, so every time a visitor views a page on the site the tag is flagged. This enables the system to collect information on how a visitor viewed a site. This system won't collect any personal information but it will collect the temporary internet address of your computer to uniquely identify you (not as an individual but for instance as "Visitor Xyz75a") as well as information on how you use the website such as the order of pages you visited or how long you spent on each page. In a very similar way the system observes the unique Bluetooth naming key that setup a user pre-define profile key to provide the user with ad/specials/incentive according to his segment and all with complete user anonymity.

Recent published research shows that, on average, people spend 90% from their time indoors.

More over, according to Research: indoor navigation maybe more important then outdoor navigation and may represent a huge new market.

The disclosed system will allow for the first time the navigation and GPS industry to tap into the local Advertising market estimated to be $134 Billion in the US alone. The disclosed innovation represent the elements of analysis+direct local content+indoor navigation=next generation local base model.

The disclosed Indoor location technologies. Various technologies are used for wireless indoor location. These may be classified in two aspects: The algorithm—i.e. the method of location used. The physical layer—i.e. the wireless technology used to communicate with the mobile device.

Location Methods

Typically, the methods used in indoor locations are "borrowed" from the outdoor GPS location methods inventory. Specifically, four types of method are used indoors:

Proximity Detection (PD), Received Signal Strength (RSSI), Time of Arrival (TOA) and Angle of Arrival (AOA).

Proximity Detection (PD)

This method relies upon a dense grid of antennae, each having a well-known position. But the system reverses the normal detection or localization method in most cases the mobile is detected by a tag/beacons in the disclosed method, the user mobile with the Bluetooth special software scan the area for a known location and a known list of tags/beacons install in the area/facility/store building the tags/beacons have an known name/ID that broadcast and when the user mobile is in the proximity to the tag/beacons it is considered to be collocated with it. When more than one signal detects by the mobile, a simple triangulation process is determine the location in any case the short range of the Bluetooth in this case and in indoor make it a big advantage as it the accuracy can be less then 10 m.

This method is relatively simple to implement. It can be implemented over different types of physical media, and it is the disclosed method of indoor navigation.

Like the PD method, triangulation is relatively simple to implement.

WLAN (IEEE 802.11b): This midrange wireless local networking standard, operating in the 2.4 GHz ISM band, has become very popular in public hotspots and enterprise locations during the last few years. With a typical gross bit rate of 11 Mbps and a range of 50-100 meters, IEEE 802.11b is currently the dominant local wireless networking standard.

It is therefore appealing to use an existing WLAN infrastructure for indoor locations as well, by adding a location server. Such solutions do exist in the market. One limitation of such systems is the fact that WLAN tags are relatively bulky and power hungry. Thus, such locators are mainly useful to locate WLAN enabled instruments, such as portable computers. Note that in WLAN, antennae are actually part of access points (Apes), through which devices communicate with the access network.

Bluetooth (IEEE 802.15)

Bluetooth is a newer wireless local networking standard that operates in the 2.4 GHz ISM band. Compared to WLAN, the gross bit rate is lower (1 Mbps), and the range is shorter (typically 10-15 meters, although there are tags with a range of over 300 feet). The shorter range makes it advantage indoor when you need more accuracy. Also, Bluetooth is a "lighter" standard, highly ubiquitous (embedded in most phones, Personal Data Assistants (PDA's), PC peripherals, etc. exist in more then 85% of the new cell phones) and supports, in addition to IP, several other networking services. Notably, Bluetooth supports serial port emulation, voice, and various types of object exchange.

Bluetooth tags are small, pocketsize transceivers.

Every Bluetooth device's tag has a unique ID. This ID can be used for locating the tag.

Bluetooth Indoor Location

How does Bluetooth location work?

Bluetooth was not made originally for location. From the outset, the standard was designed for communication, in a personal area networking (PAN) environment. However, to facilitate this task, particularly in dynamic ad-hoc scenarios, devices need a mechanism to identify their neighbors, to synchronize, and finally to connect. Such mechanisms have indeed been built into Bluetooth. More importantly, these mechanisms can also be used to obtain an accurate location.

The approaches to Bluetooth location: Finds a tag by using one of two Bluetooth mechanisms, Inquiry and Paging that are used normally for link setup:

The Inquiry mechanism—provides a way for a Bluetooth device to discover its neighbor's Bluetooth ID. An inquiry process typically takes 5 s. it concludes with the inquirer (typically the user cell phone) having the IDs of all those Bluetooth devices beacons (tags) install in the area/facility.

The Paging mechanism—following an inquiry, the inquirer can page (set up a link with) one or more of its discovered neighbors. A paging process typically takes 1-2 s. This mechanism is faster, but requires a previous knowledge of the tag's ID (as well as the Bluetooth clock phase). The relevant location scenario is that of searching for a certain tag. It is the most accurate and the faster response time and it is the disclosed method in door navigation when and where each tag is known address position—waypoint.

Why use Bluetooth for indoor location? Bluetooth has some advantages in the context of indoor location. These include:

A. Bluetooth uses RF—in the 2.4 GHz ISM band, specifically. In this frequency range, radio waves penetrate obstacles, such as walls and human bodies, albeit with a substantial loss.

B. Bluetooth is ubiquitous—Bluetooth chipsets are being implanted everywhere nowadays (phones, accessories, computing devices, etc).

C. The fact that a Bluetooth location system can locate any Bluetooth enabled device makes it more cost-effective. This means that an increasing fraction of humans and mobile assets around would become locatable in a Bluetooth covered site, with No additional hardware cost (no tags attached). The only need is to pre-register these devices.

D. Bluetooth is a low power technology—tags need recharge, approx. once a week (or longer, depend on the usage scenario). Non tags (e.g. Bluetooth enabled phones) are being recharged anyway on a regular basis, so they do not need special recharges. If they are being used for location, the fraction added to their usual (no Bluetooth) power consumption is relatively small.

E. Bluetooth is a low cost technology—the expected high volumes of production (hundreds of millions annually) lead to sub-$5 per chip. This goal has already been met by few IC manufacturers. This would eventually result in a low price for the Bluetooth tags, if and when Bluetooth location systems would become sufficiently ubiquitous.

F. Bluetooth is a multi-functional communication standard—location is only one of the services that can be supported by a Bluetooth infrastructure. The same infrastructure can be used to provide additional network services, particularly remote monitoring and control (by using a serial interface). In addition, Bluetooth provides voice and IP services.

G. In open spaces, relatively free of obstructions and walls (e.g. a large warehouse or a public hotspot), Bluetooth alone would suffice to provide an approximate 2-10 meter error range and that is the range for locating store in a mall or even go to a product in a store.

Conclusion

The Bluetooth technology offers two unique advantages: one is the penetration into the market—more then 85% of the new phones.

The other advantage is the multi-service nature of the Bluetooth infrastructure that enables using the Location access tags for other purposes, such as for navigating, remote monitoring and control, and for a variety of IP and messaging services.

Applications:

The system use and costs should scale well with its ability for multi use in an emergency and in non emergency to provide local navigation on malls/store campuses, buildings, hospitals, hotels, malls etc., without GPS or cell network using the Bluetooth beacon for navigation. Some of the key applications are:

NAV4Mall, NAV4Store, NAV4Sale, or just University or Building Navigator Explore the indoor mall or inside a department store, navigate to the right place or the store or the department that you need. Navigate on the mall map/store mapping to find your way around all using your cellular phone or navigation system without a GPS. A new kind of service and new marketing way for the malls/store business owners an add-on to local advertising.

With an indoor navigation based on the local map/mall that will provide the user a navigation to his desire location in the mall/store to the right And receiving content according to his pre define preferences the user can be directed to a Store/product even isle inside the store as well a new marketing tool to the store/mall owner to get the customer with a new service. The store will have also an option to deliver more content (advertising, sale, coupons, promo etc.) to the user when he approaches the store or already is inside via Bluetooth push to the user cellular Bluetooth enable. And in emergency—the nav4emergency will kick in, the nay-store mall module is the one that describe in more details in the patent application.

NAV4Museum, NAV4Conference, and/or NAV4Show, explore museums or conference show exhibits in a new unique and easy way, find your way around when navigating on the floor map of the museum conference or the show, indoor navigation, navigate to exhibits restaurants, cafes, lavatories etc., all to the "user" navigation or cellular phone. Any Museum Conference or show provided to the attended a mapping to the exhibits, some provide also additional audio device (headset) to get more information on the exhibits. The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories etc. All to the "user" navigation or cellular phone and based on the facility map. And in emergency—the nav4emergency will kick in.

NAV4Train

For all the users of mass transportation system the disclosed innovation will allow locate and point the "user" to the exact station or location on a route, an easy way to navigate in the train, subway, underground kind of system, a new way of "subway" or bus mapping in/out door and directly to the user's navigation or his cellular phone. Every day millions of people are using the mass transportation system, trains, subways, buses, each of the passengers depend on the transportation map for the route information as well as schedules and additional services provided by the transportation system. Most of the passengers of today carry with them a cellular phone.

The disclosed unique innovation will provide the passenger with the navigation inside the transportation system directly to the passenger's Bluetooth enable phone; the passenger will know exact location/station on the route as well with additional option information like schedules. A new add-on service to the transportation providers as well to the passengers, utilize the disclosed indoor navigation method, And in emergency—the nav4emergency will kick in.

NAV4ThemePark

Theme and amusements Park navigation, navigate to your desire attractions as well with a new way for register to a "fast pass" kind off lane all in an easy way to the "user" cellular phone without need for GPS Provides a new media and-on service. Ever wonder what it will be like to navigate inside the amusements park to the desired attraction, to know the schedules of the shows at the attractions and even to get your "fast pass" from a remote instead of standing in line. With the disclosed unique innovation all can be become reality and directly to your cellular phone without the need for a GPS. It is believed that the disclosed innovation can provide a new tool and service to the benefit of the amusements parks as well to the user. And in emergency—the nav4emergency will kick in.

Cellular next "Killer Application": Emerging technology markets are always on the lookout for that elusive "killer app"—the precious, irrefutable application that makes adopters stand up, take notice, and open their wallets. Once it's found, and as soon as adopters realize firsthand the value to be achieved, that killer application eventually Expands into other, more advanced areas of adoption and innovation. According to research, the next in cellular telephony will be service depend on location base programming, when the cell phone user will receive information according to his location.

There are more than 4 billion cell-phone users in the world. Each day, thousands more sign up. A variety of mobile devices have been developed in recent years that are capable of supporting dynamic navigation and location-based services applications. These include wireless telephones, personal digital assistants (PDA's), personal navigation devices (PND's) and laptop computers. It is believed that the disclosed innovation will meet the desire of wireless service providers to increase their average revenue per user.

SUMMARY OF THE INVENTION

In accordance with the present invention, these are the disclosed project's characteristics:

The main object of the present invention is to provide the indoor navigation and a special application for indoor without the need for GPS communication, nor central system or costly infrastructure are needed, also no need for internet or even cellular communication at all.

It another object of the present invention to provide a method of indoor navigation and special indoor application using a Bluetooth-enabled devices especially cell phone.

It is another object of the present invention to provide a method of special application for mall/departments store or regular store, building down town centers and other facility area especially but not limit to indoor.

It is another object of the present invention to provide a marketing model method especially but not limit for the LBS market.

It is another object of the present invention to provide a business model method especially but not limit for the LBS market.

The foregoing and other objects of the present invention are achieved by providing an infrastructure of a Bluetooth beacons/tags installed in a known location in the area/facility, each tag/beacon have his own unique ID and a Bluetooth name to ID the location in the area, the tags/beacons broadcast the ID.

Mapping of the area/facility will be download at the area/facility or pre download before arriving to the area/facility, the mapping contain a lookup list of the tags/beacons installed in the area represent a waypoint on the map.

Bluetooth application—The associated application operating on the cellular phone/Bluetooth enable device will scan the area/facility for the known list of the tags/beacons. ID/name when a Bluetooth tag that matches the list responds proximity detection establish with 5 m accuracy. When more then one beacon signal received a simple triangulation will be done to find the current location. Other Bluetooth device not on the list will be filter out.

The locating is established and will be display on the map. And because the location of the other tags/beacons is known navigation between the current location and a desire tag/beacons that represent waypoints are easy to achieve.

In reality no communication are establish at all between the tags/beacons and the cell phone.

The disclosed system is a navigation method based on the following unique characteristics:

The disclosed main idea is based on the concept of direct communication between mobile phones and a sensor network (what is referred to as way points). No Internet and no cellular network are needed.

The system is based on Bluetooth communication protocol that is available on almost any new phone.

The disclosed innovation reverses the current idea of "locating" the user by letting the user navigate utilizing to the sensor network of Bluetooth beacons (whose signal is sent by way points) directly to the user's mobile device. This will allow LBS (Local Base System) navigation, even indoors without GPS or Cellular network.

The beacon can reach from 10 meters to more than a 1000 meter distance depending on the application. (to get more accuracy less range and more beacons may needed so the 10 meter is more then needed in building/room environment) getting more range to the "box" is as simple of attaching bigger antenna.

To comply with privacy concerns the disclosed method takes the user's privacy to the highest level Although the disclosed method is like creating a cookie in the cell phone (not the same as internet cookie where the cookie is generate and controlled by the web sites) but generated by the user and controlled by the user and more importantly—encrypted and secured as a key.

The user is in a complete control, they have the choice to turn it on or off at any time.

We respect user privacy and do not collecting any personal Identification, like name address telephone number or other personal Identification.

Moreover the profile input by the user is encoded as a key, with multiple profiles to choose. The possibility of recognizing the user by the key is close to none.

There are three options for the user preference:
1. Only user segments generate key, no specific user Id.
2. Segments and part of the Bluetooth device ID encode as a key.
3. User can choose to be registered (membership privilege, student in a university, school, and business especially for receiving direct incentive specials coupons etc., and for a full nav4emergency protection.

We let the user choose between participating and receiving incentive, special sales, coupons and local content tailor to the user preference, all for free, or they can choose not to participate and pay a small fee for the service and the software. In any case the user's privacy is still protected to the highest level compare to any normal daily use of the Internet!

There is also a great benefit to the user participating—they can have full emergency notification directly to their phone and in an emergency they can be directed by the emergency procedure in the area/building/mall/store and navigate to the exit route, even if the cellular network fails due to the high volume of traffic occurring in an emergency situation.

In the disclosed method there is no detector or tracking for the user, the user themselves engage the scanning and detecting method to find the beacons in the area.

The secure encoding key method can be used to secure other applications or processing where the privacy and security are needed most in near field applications.

It is suggested that the data aggregated by the disclosed method be stored and used in only a 30-day period.

Other than that, the disclosed invention includes a full suite of applications for the benefit of the user, from parking to sales specials to indoor navigation, to be informed and notified in case of emergency and directed to the exit route to safety, and all for free*.

The disclosed method can be attractive not only for shopping malls, department stores, or downtown strips but also to high rise buildings, commercial buildings, universities, schools, museums, amusements parks, trains, subways, and hotels.

It can also be attractive to search engines, advertising companies, cellular phone operators, manufactures, GPS companies, mapping, local businesses, local advertising, and more specifically location based services (LBS). The disclosed method can give the LBS a new meaning—the business model that's made easy.

A facet of behavioral targeting has been around for a while but mostly on-line but it's been gaining traction among ad agencies retargeting program is now a key planning consideration for its advertisers.

Why? The primary reason is because retargeting is a powerful means to bring lift to ad campaign results, generating higher conversion rates and lowering acquisition costs. You can't get much more effective than targeting a person who has shown interest in a product but didn't buy with a related ad that then gets him to buy, right?

The legacy of LBS technologies that marketers today rely on generally fail to tap the unique opportunities of local advertising market estimates to be over $150 Billion in US alone, people are spending more then 80% of their time indoor, But with no clear technology to provide indoor navigation and not clear business model, The advertisers, the business are disillusioned with the promise of LBS but are still longing for a solution that properly addresses the significant audience represented by the explosion of cell phones use and the availability of content.

It is believed that the disclosed innovation technology and business model can provide the next generation method for the LBS market to tap into the huge market opportunities.

Where the disclosed system is unique:

The disclosed innovation is based upon Bluetooth technology, which is built in more then 85% of the new cell phones (compare to only 5% of Wi-Fi). As explained before, the disclosed Bluetooth method represents more accuracy and practical deployment then Wi-Fi.

The disclosed method is about navigation, and more precise—indoor navigation, the disclosed method is not for tracking or locating user, it's about providing the Bluetooth user device navigate in a building/area/mall store to a known setup of tags/beacons that installed in a known positions in the area.

The navigation can be for a real place like store restroom etc., or for sales, coupons, specials in an area/store etc.

The navigation method is the same as normal GPS method, on a map of the area/store/mall The disclosed method represent a very unique way of locating the exact location, in the disclosed method the user scan the area for a known list of beacons/tags, there is no detectors and no scanning for user device/phone, the user control the scanning of the area for the known tags, in reality there is no communication to be establish at all, the user device scan the area for a known tags and the determination of the location done by able to scan tag/beacon from the list—meaning establish proximity to the tag/beacon and accuracy less then 5 m.

Add to the disclosed navigation is the special indoor application design especially for indoor/store/mall shoppers from finding where the user park his car to find/search of directory to an emergency alarming and notification.

More over all of the disclosed innovations are not depend on cell communication or internet and for the navigation method there is no need for central system nor expensive infrastructure, in fact the user device-cell phone as well with the infrastructure tags/beacons have battery built in and can work even if the electricity is out, a very important in emergency situations.

More over our sale sense marketing method comprising a unique way of delivering local content, advertising, coupons, special sales etc. pin point according to user profile preference input by the user and encode as a secure key into the user Bluetooth naming to be decode by delivery entity that will decode the user profile/preference and with additional record of user behavioral activity will provide simple and secure method for targeting user for LBS services and other services like near field communication.

The user profile is not a text or file that reside in the user device it is a key encode into the user Bluetooth naming and can recognize only by the deliver entity that can decode the user key (like a Vehicle Identification Number (VIN)). It is not the device profile and not the user device profile.

The disclosed innovation provides a full line of indoor navigation application especially to places/area where the GPS can't be provided and more accuracy needed.

BRIEF DESCRIPTION OF THE DRAWINGS

A better understanding of the present invention may be obtained by reference to the accompanying drawings, which should be considered in conjunction with the detailed description, all in accordance with the present invention.

FIG. 11 show illustrates of the return2parking method.

DESCRIPTION OF THE PREFERRED EMBODIMENT

Figure 1:
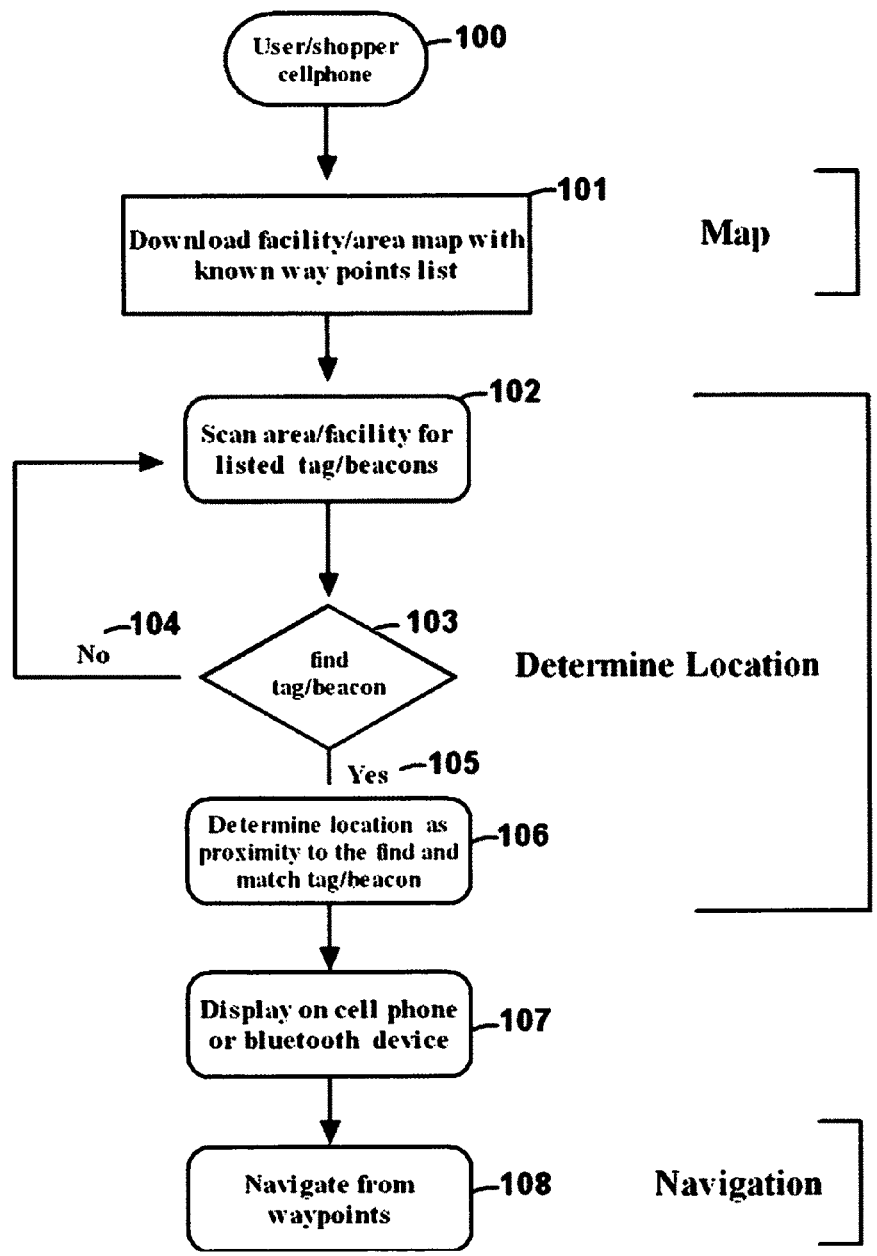
FIG. 1 is a drawing of the indoor navigation procedure.

In all the figures of the drawings, sub-features and integral parts that correspond to one another bear the same reference symbol.

Referring now to the drawings in detail and first particularly to FIGS. 1-12 thereof.

FIG. 1 is a flowchart illustrating of the indoor navigation procedure according to an embodiment of the present invention. Referring to FIG. 1, the user with cell phone (100) approach a facility/area where he can download the facility/area map (101) with a known list of waypoints represented by Bluetooth tags installed in the facility/area in a known places. The user cell phone application will scan (102) the area/facility for the known list of the Bluetooth tags/beacons, if tags/beacons was find (103) and (105) then the location of the user is determine as proximity to the find and match tag/beacon from the list (106) scanning is continue if no tags (104) was found, when found the location is display on the loaded map over the cell phone or Bluetooth device (107) and have the ability to navigate (108) between way points Accuracy is below 10 m and in case of approaching signal from more then one beacon/tags a triangulation method will perform to determine the exact location. The method gives the user the control and the privacy as his cell phone device is the scanner and it scans the area. In reality and the unique method there is no established communication at all as the scan reveille the tags/beacons name (store name) or waypoint location like Macy's. Without to establish any communication between the tags/beacons and the cellular phones and there is no need for Internet, GPS, central system or even cellular communication to perform the navigation making it a unique approach compare to other indoor navigation methods.

Figure 2:
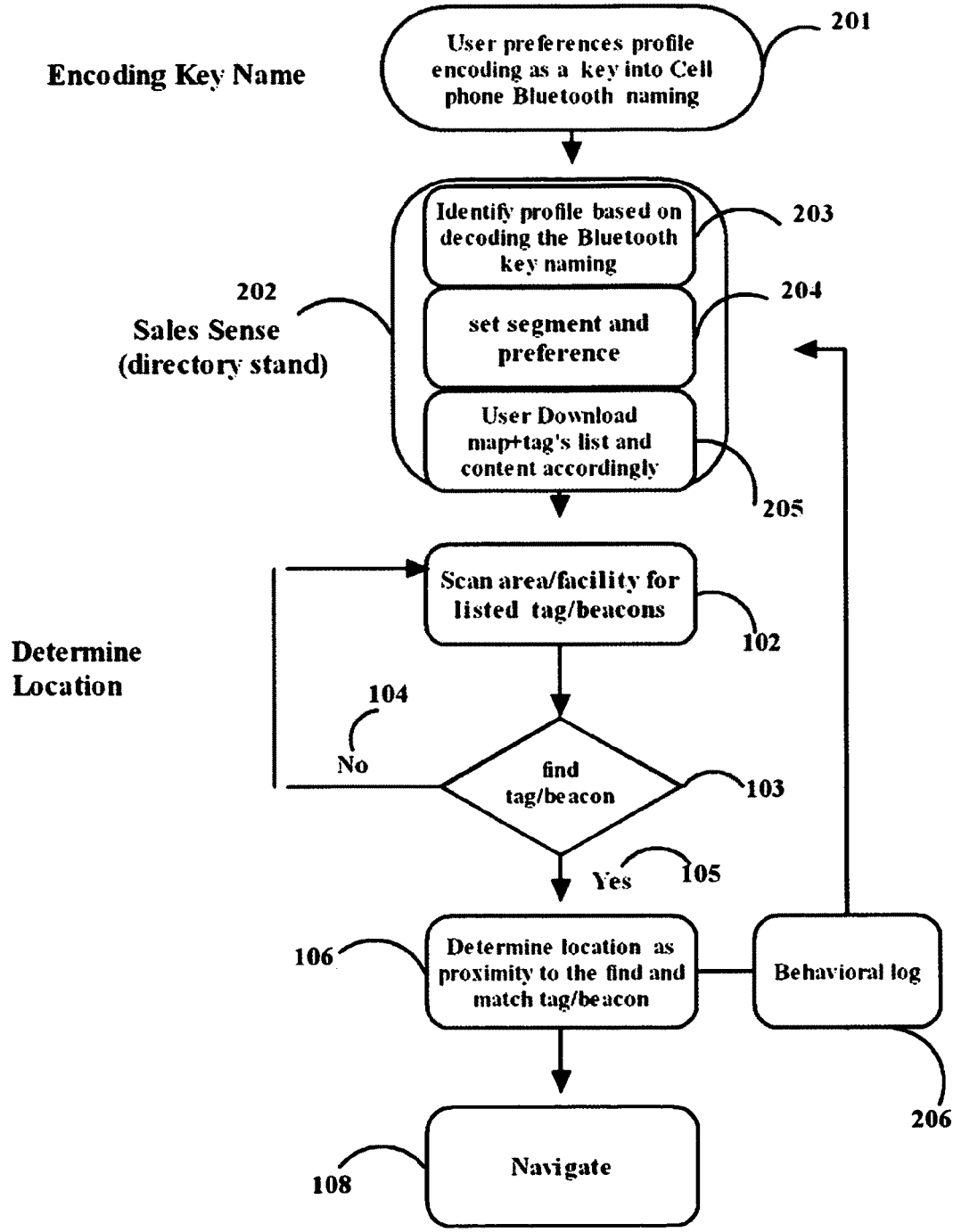
FIG. 2 is drawing of the sales sense marketing algorithm.

FIG. 2 is a flowchart illustrating of the sales sense marketing algorithm according to an embodiment of the present invention, referring to FIG. 2, in the sales sense method the user input his profile preference in the associated Bluetooth application, the profile can contain gender, age range and sales preference of the user, the information will be encode into the Bluetooth naming of the cellular phone as a key (201), like a car VIN #, to provide maximum privacy and secure to the user there is no personal ID nor cell number or any information that can reveille the ID of the user just information that can set the user preference and sales segments without compromise the user privacy, when the user approach the area/facility with the disclosed system/tags/beacons installed the directory stand or the entity system (202) that provide the user with the mapping of the facility/area will determine and identify (203) the user profile based on decoding the Bluetooth key naming (201) and set the sales segment and preference (204) and accordingly will provide the user with the area/facility mapping and the local content according to the user profile/preference, providing direct and targeted method of delivering local content advertising coupons special sales etc. according to the user location determine by scanning the facility/area (102) for the known list of tags/beacons and determine the location according to the proximity (106) to the find tags/beacons, the log of the movements around the facility will provide behavioral sales method to be add to (204) the sales segment and preference, in a unique part of the disclosed innovation method, not only the disclosed innovation can provide direct content according to user location also can direct and navigate the user (108) how to reach the place of the special sales, coupons providing a complete and unique approach to indoor navigation where the user own input of profile and preference with the user behavioral, sales habits can be use together for the user and the store/facility benefit to provide the user with direct local content and even navigate him to the places even to the store location isle where the sale special coupons take place and all without compromising the user privacy.

Figure 3:
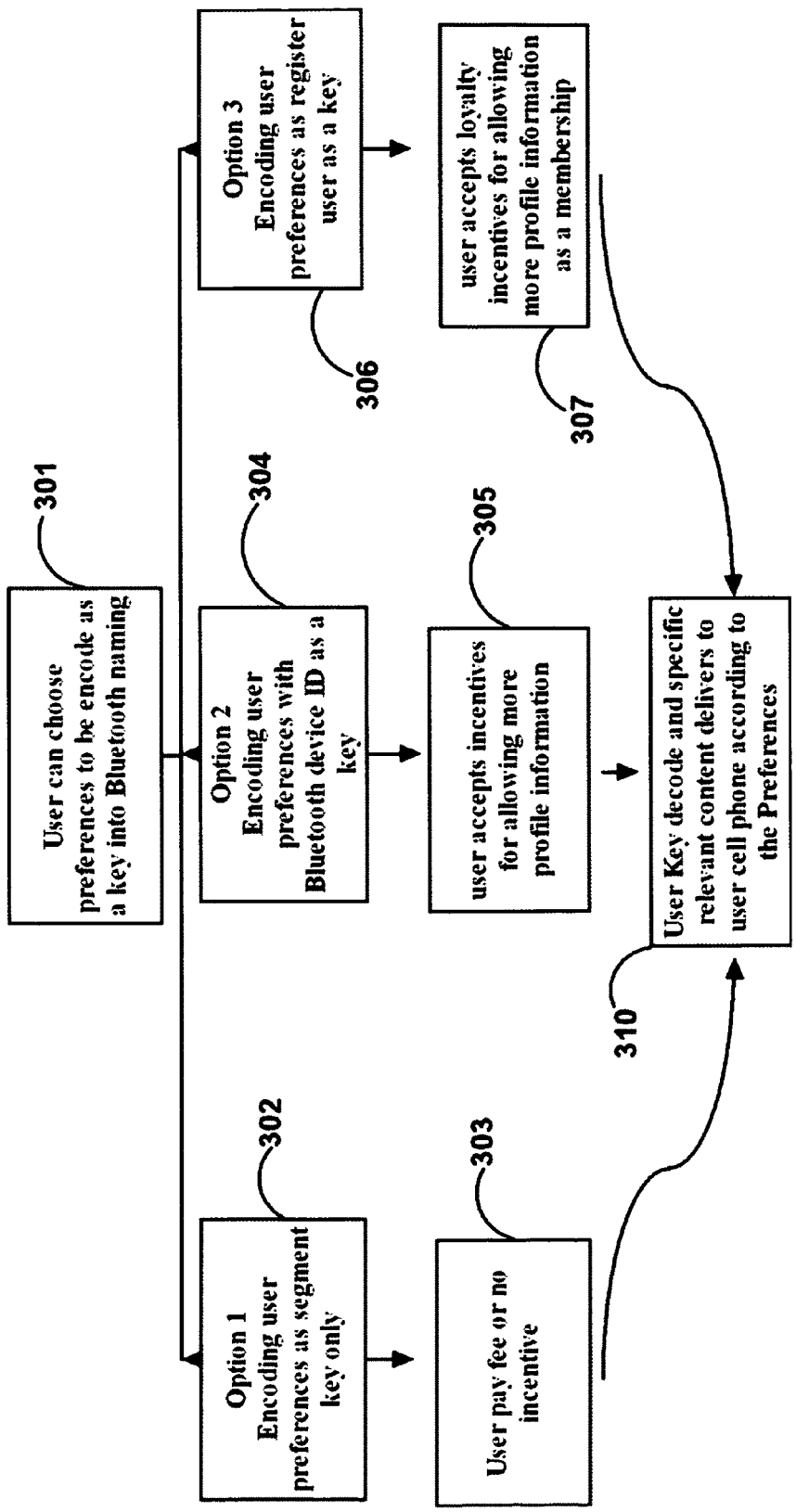
FIG. 3 shows the drawing of sales sense user preferences/profile options.

FIG. 3 is a flowchart illustrating of sales sense user preferences/profile options according to an embodiment of the present invention referring to FIG. 3, the user can choose preference to be encode as a key into the Bluetooth (301) the options represent ability of the user to become and be benefit of member like of the facility/store/mall by providing additional profile/preference that can assist the area/facility store mall owner to provide the user with more of direct and targeted contents according to the user preference but under user control and all with great attentions to the user privacy, option 1 (302) is part of the associated application suite where the user preference encode as a key into the associated naming in a method that only the sales segment can be reveille and the user may pay fee for the software or receive no incentive (303), the other option, option 2 (304) the user provide preference with part of the user Bluetooth device ID encoding as a key, the user will accepts incentive (305) for allowing more profile information the incentive can be in a special sales, coupons etc. Again, no personal information are exposes and the user is in complete control over the information or the software at all time option 3 (306) is when the user would like to be register us a member of the store/mall facility to get the full benefit and to be recognize (again not personal information or any ID are exposes) for example when enter the store/mall/facility with his carry on profile/preference, the user will accepts loyalty incentive for allowing more profile information as a membership (307), in all the options the user key will be decode at the area/facility and specific relevant content will be deliver to the user cell phone according to the user preference/profile (310) all under user control and without comprising user privacy.

Figure 4:
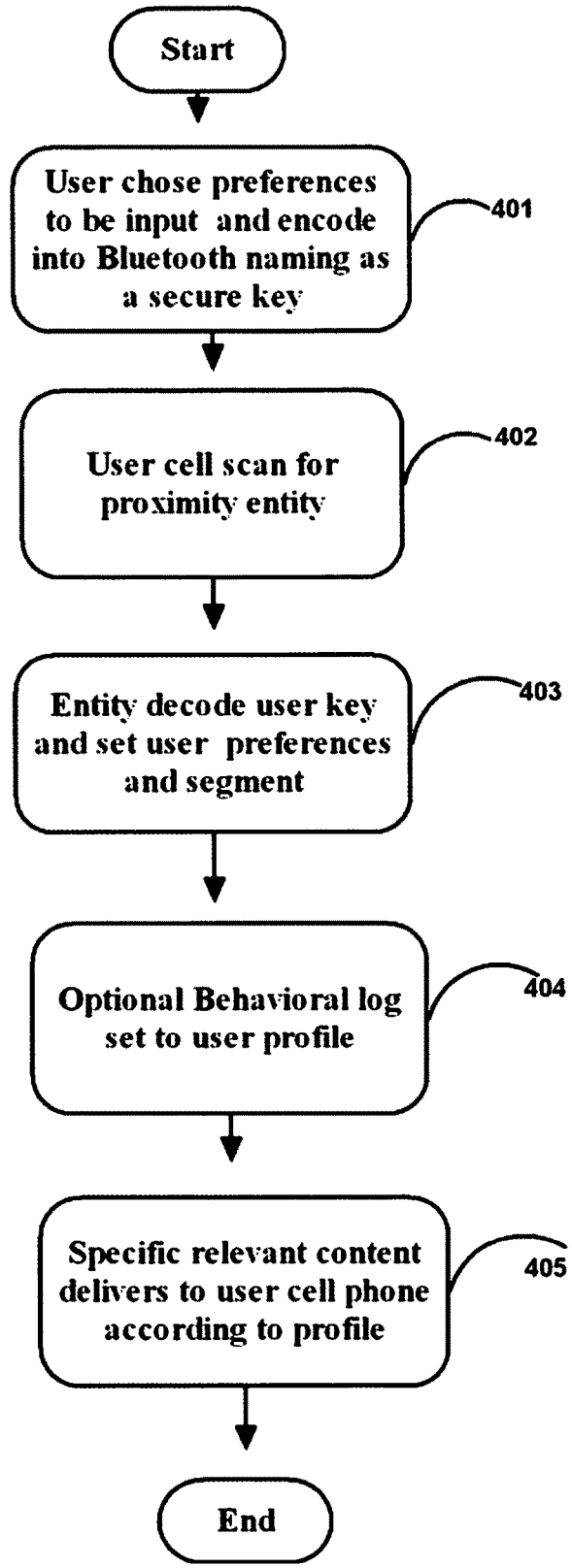
FIG. 4 is a drawing of secure user preferences/profile.

FIG. 4 is a flowchart illustrating of secure user preferences/profile according to an embodiment of the present invention, the user chose preference/profile to be input and encode into Bluetooth naming as a secure key (401), the user cell phone with associated application scan the proximity area (402), in the area/facility (for example in a mall at the entrance or at the directory stand where the user can receive and get the area/facility map the decoding key will be process (403) and will set user preference and sales segments, an optional behavioral log(404) will be add to (403) to provide profile, preference and behavioral information about the user all under the user control and without reveille the user ID or effect his privacy, it is like bringing the web sales into the reality and give the user ability to receive a direct local content according to his preference that will be deliver (405) to his cellular phone according to his profile/preference.

Figure 5:
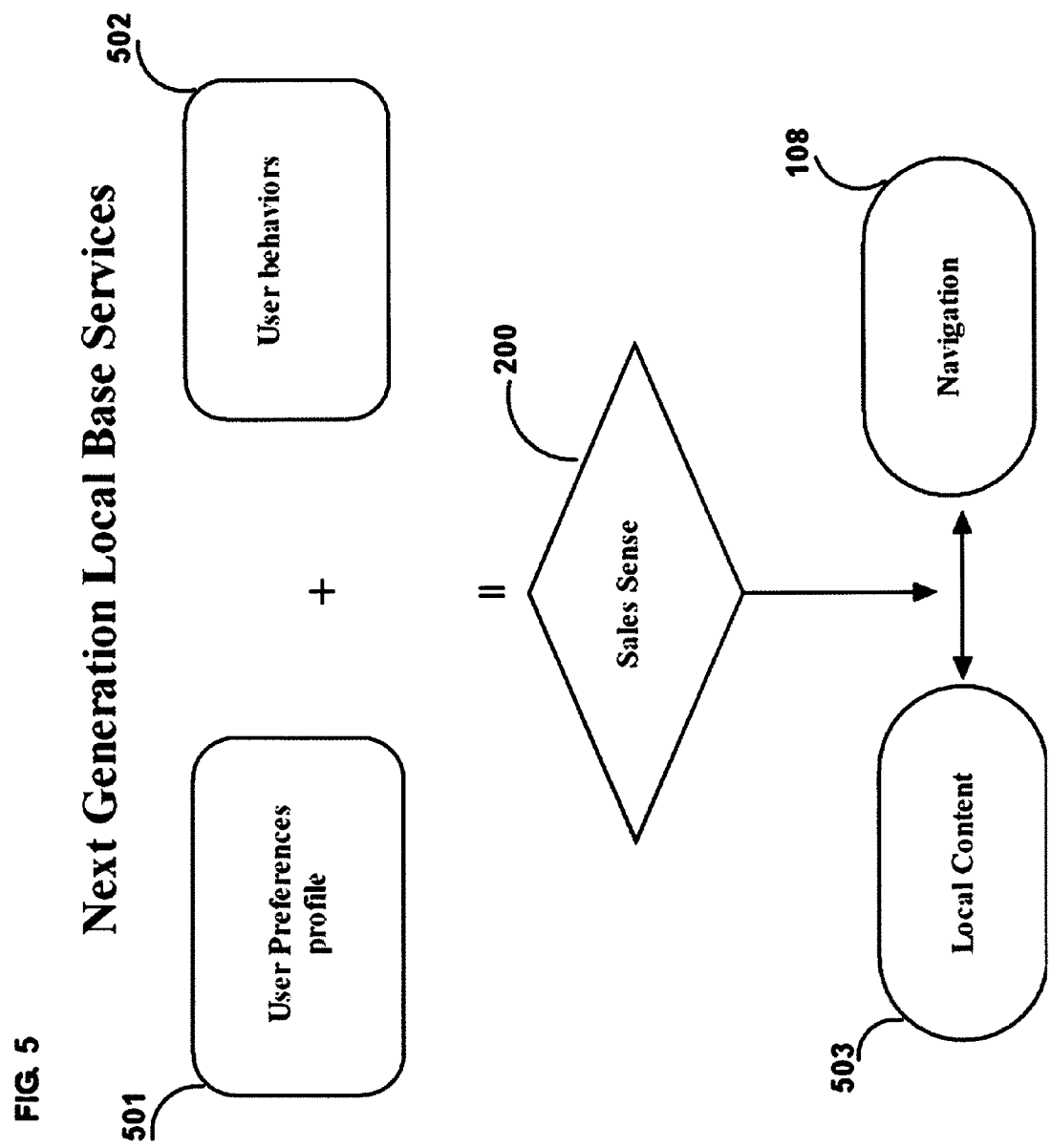
FIG. 5 is a drawing of the next generation local base services (LBS).

FIG. 5 is a flowchart illustrating of the next generation local base services (LBS) according to an embodiment of the present invention referring to FIG. 5, in the disclosed business method brings together the user input of profile/preference (501) plus the user behaviors (502) in the area/facility/store mall to be integrated into the disclosed sales sense method (200) where a direct and targeted local content (503), advertising, special sales, coupons etc. Will be deliver to the user according to (501) user preference and (502) user behaviors and direct the user and navigate him (108) to the store area isle where the sales special coupons are.

Figure 6:
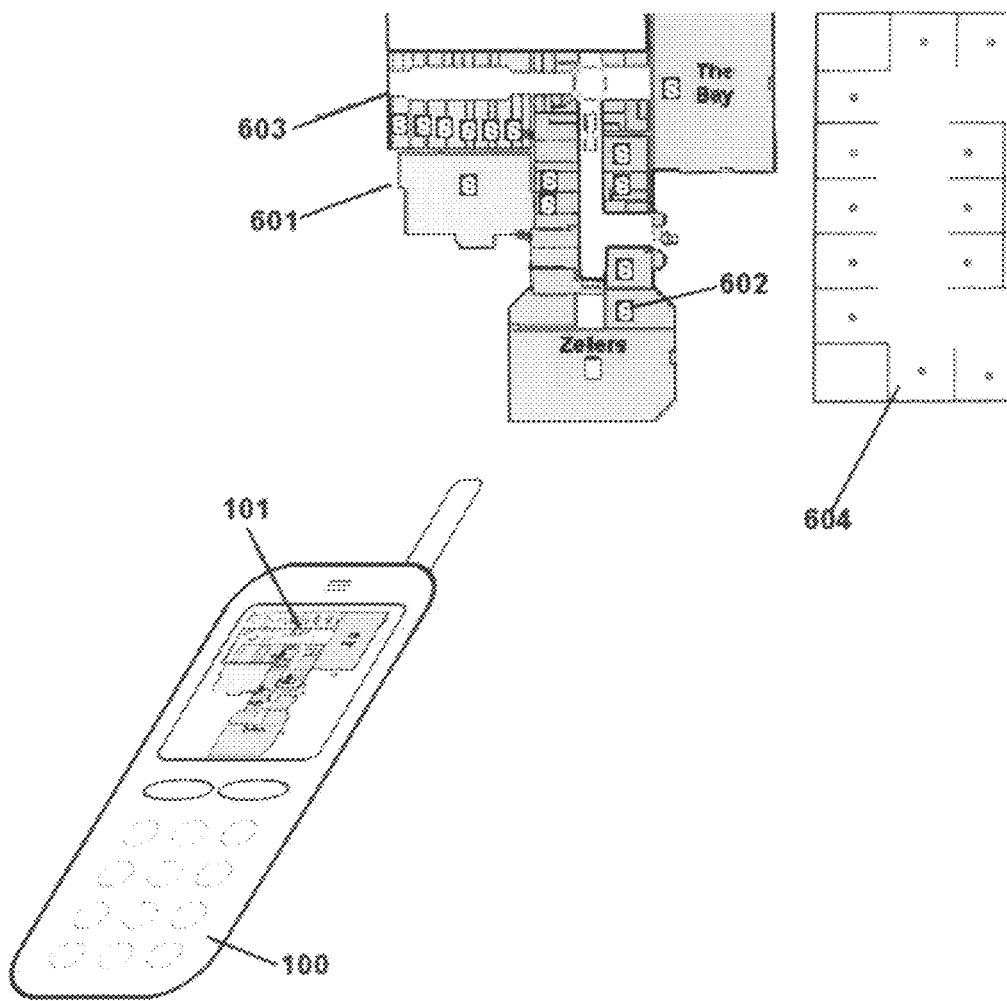
FIG. 6 is illustrates the implementation of the tags/beacons in a mall application.

FIG. 6 is illustrates the implementation of the tags/beacons in a mall application according to an embodiment of the present invention, each of the Bluetooth tags/beacons (602) contain the name of the waypoint (Macy's for example) and the location of the tags/beacons are known and load in a list with the map of the facility (101) into the user cell phone (100), the list allow matching of the tags/beacons signal (names) (602) to the known list loaded with the map (101) to determine the proximity to the tag/beacon providing accuracy to less then 10 m the tags/beacons (602) can be install in the area in each location designated as way point store/rest room/special sales special location etc. The user can download the map (101) at the entrance (603) from the directory stand or pre download from the indoor mapping portal, the beacons can be installed also in the parking area (604) and with additional sensor to determine existence of the parking car in the parking area can provide the user with parking navigation to empty parking.

Figure 7:
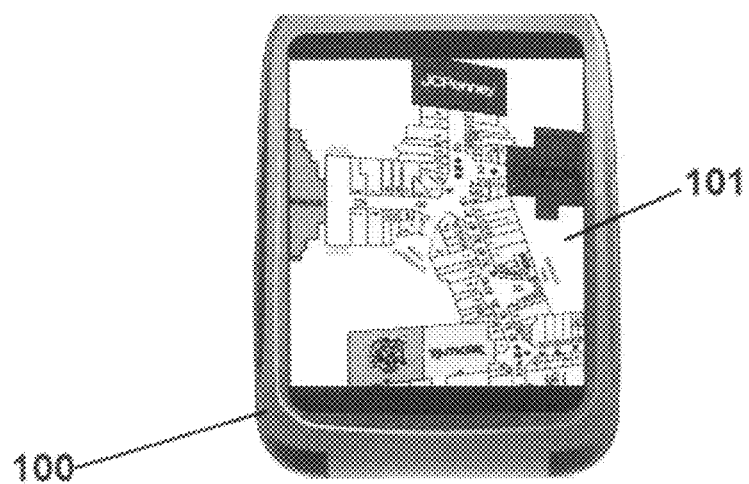
FIG. 7 illustrates the user cell phone with the indoor mapping as part of the mall applications.

FIG. 7 is illustrates the user cell phone with the indoor mapping as part of the mall applications according to an embodiment of the present invention where the user cell phone (100) will load the area/facility/building, map (101) at the area or pre arriving from indoor mapping portal over the Internet.

Figure 8:
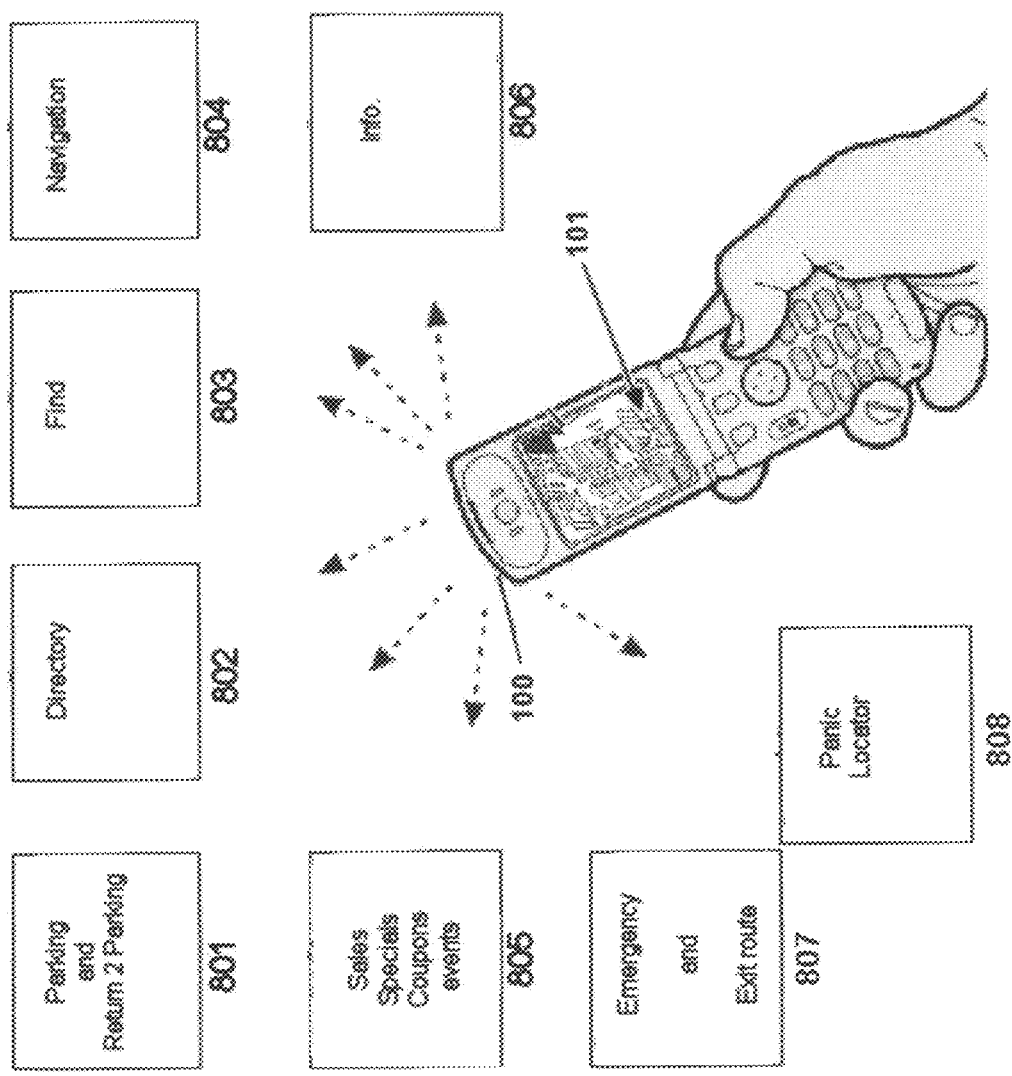
FIG. 8 is illustrates the indoor mall/store application.

FIG. 8 is illustrates the indoor mall/store application according to an embodiment of the present invention referring to FIG. 8, the disclosed innovation provide a complete indoor application to the benefit of the user in a way it is like taking the directory stand and indoor navigation to the user cellular phone (100), starting with ability to find parking (801) and the ability to find where the car parked (return2parking method) to the mall/store directory isle products (802) with ability to search and find (803) and navigate between waypoints indoor (804) to store and even to sales, specials coupons and special sales events (805) and important information about the area/facility like rest rooms key area playground kids area and in emergency event provide the user with emergency information alarming and notification directly to the user cell phone even if other communication method like cellular communication will fail during the emergency the user can be notify and direct to the safety exit via the disclosed nav4emergency method as part of the disclosed indoor application (807) also in case of emergency the user can punch on secure panic button to ask to be located immediately by the authorities. (808).

Figure 9:
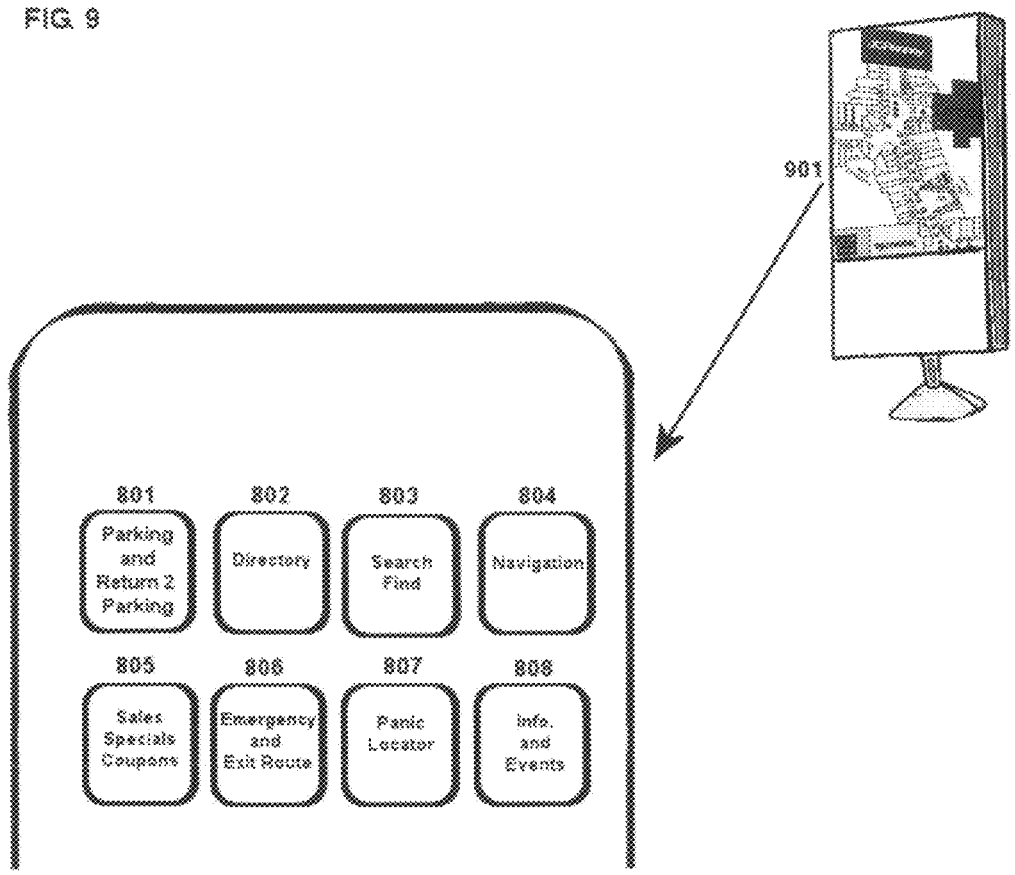
FIG. 9 is illustrates the mall directory as part of the mall applications.

FIG. 9 is illustrates the mall directory as part of the mall applications according to an embodiment of the present invention referring to FIG. 9, it's illustrates the indoor application in the user cell phone as a buttons each represent the indoor programs describe in FIG. 8, from (801) parking and return2parking, (802) the directory, (803) the search and find (804) represent navigation request between the known way points, (805) the sales, specials, coupons, (806) will provide the user with emergency and notification and exit route and emergency procedure that so important to building/area in case of emergency (9/11, Virginia tech etc.) To a secure panic button (807) that can trigger locate the user (like 911 call) in the area by the security personal and (808) button provides information and event info. About the area/facility/mall/store.

Figure 10:
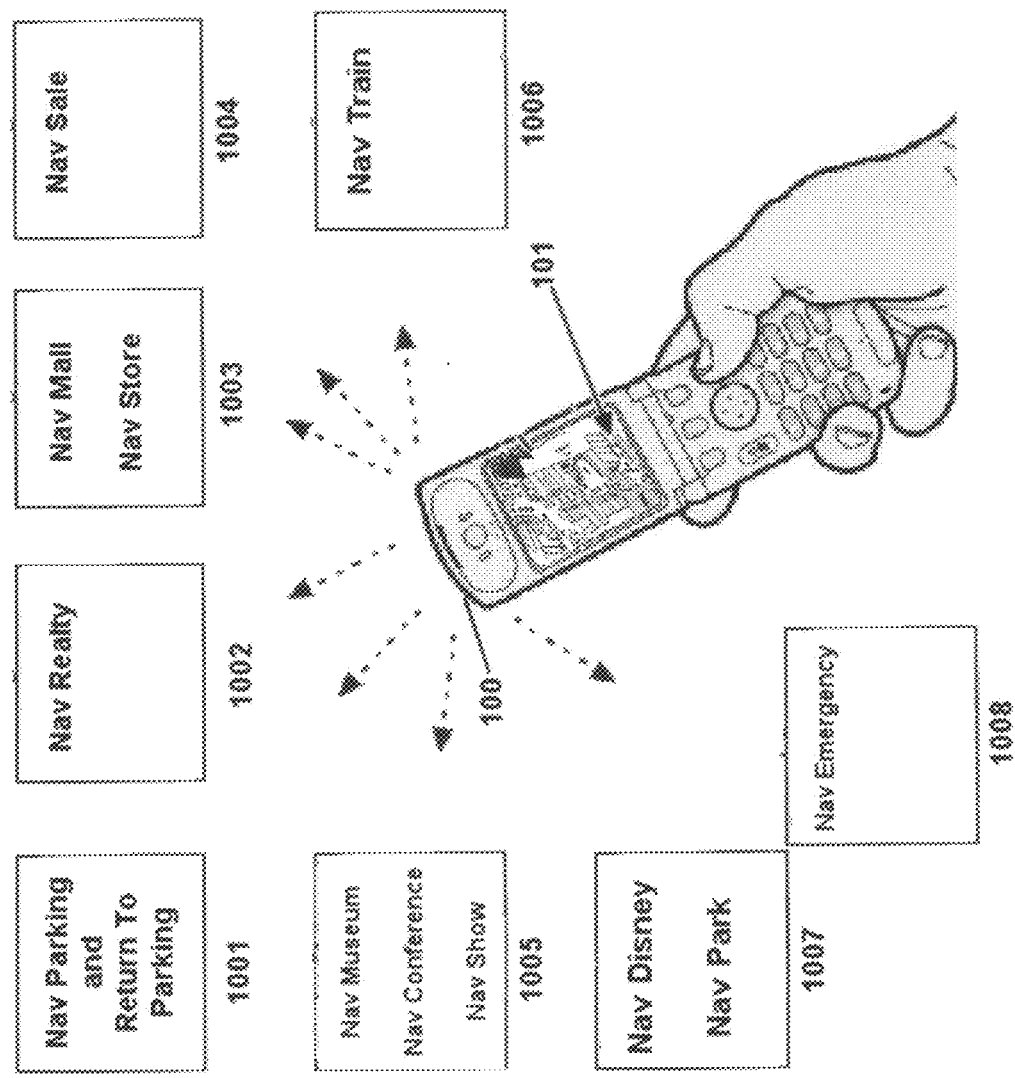
FIG. 10 is illustrates the indoor or LBS application.

FIG. 10 is illustrates the indoor or LBS application according to an embodiment of the present invention, referring to FIG. 10, it's illustrates the indoor applications that can be use from nay parking to provide parking information in a parking garage or at the mall parking area to provide the user with direct navigation to empty parking (1001) to provide the user with information where he parked his car in the mall/garage return 2 parking method (1001), To navrealty (1002) where the user can be inform locally via the Bluetooth tags/beacons and navigation method of the local area real estate information directly to the user cell phone, to navmall/store (1003) that describe in more information in this patent applications to navsale (1004) where the user can be directed to the special sales coupons etc., the same method can be use in a museum conference show (1005) where the tags/beacons installed in a know places in the show conference museum, and the same method can be used in amusements parks like Disney, Universal Studios, etc. where the user can be provide navigation in an area where GPS navigation can't provide or not accurate and provide with navigation information even tickets and fast pass with accuracy less then 10 m directly to the user cell phone and all without requirement of Internet bandwidth or even cellular communications, and in emergency event provide the critical information that each user need of emergency procedure, emergency map and how to go to safety (1008), the same method can be provided in subway, underground or train buss mass transit where the user can be provided with information directly to his cell phone from beacons/tags installed in the route to give the user complete navigation on the map of the train/subway mass transit directly to the user cell phone without need for bandwidth or Internet or cell communication (1006).

FIG. 11 is illustrates of the return2parking method according to an embodiment of the present invention referring to FIG. 11, a long range Bluetooth with set ID (1100) with range over 1000 m will be install inside the parked car (1101) as a separate device (1100) or part of the car by manufacture and have an antenna (1102) built in the car to provide the signal broadcasting of the car ID, that car ID will be scan by the return2parking application to the user cell phone (100) and the scanning result will be display inside a circle represent range (1103) and (1104) where each circle represent the range to the car where (1105) represent the direction to the parked car, the user can find his parking car inside a garage out side an area to the accuracy of less then 10 m directly to his cell phone (100) without need for Internet bandwidth or even Internet or cellular communication.

Figure 12:
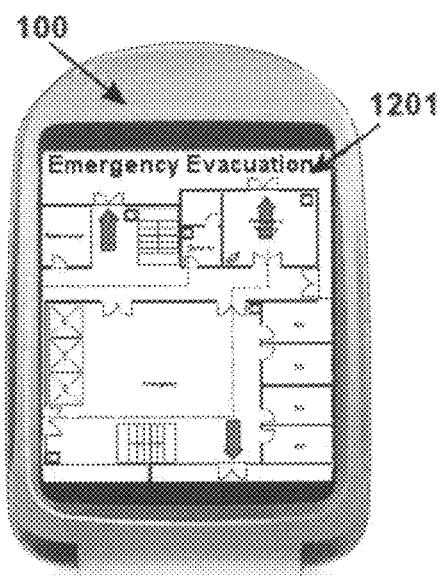
FIG. 12 show illustrates of the nav4emergency.

FIG. 12 is illustrates of the nav4emergency according to an embodiment of the present invention, referring to FIG. 12, show illustrated of part of nav4mergency where the emergency maps and emergency procedure that unique to each facility/building/place/mall/store/company/floor etc. can be display as part of the nav4emergency on the user cell phone (100) as part of the mapping or emergency map and procedure to show the exit and emergency route in case of emergency (1201), the same program can provide alarming and notification a very important and critical information for the user any where, the information will be provide to the user even if the emergency event the cellular or other communication method will be down or not available as common to any emergency event like 9/11 or Virginia tech in the disclosed innovation all the critical information from emergency procedure to emergency maps and navigation to the exit to safety are done without need for Internet bandwidth or cellular communications at all.

What is claimed is:

1. A method for navigation indoor and outdoor in a facility area like a mall department store downtown center building on at least one display device selected from a group consisting of a display device, a mobile phone, hand held navigation system, car navigation system, and a Bluetooth enabled device, the method is part of mobile application comprising steps of:

a) loading a local area/facility map of said area/facility to the display device said local area/facility map can be download before arriving to said facility area, b) determining a current position of said display device by utilizing a proximity to one or more wireless radio frequency (RF) beacons, wherein said RF beacons employ at least one of Bluetooth, long range Bluetooth, and Wi-Fi protocols, each RF beacon comprising a beacon identifier and is installed in known position within said area/facility, c) displaying said current position of said display device on a display device overlay image overlaid upon said facility/area map, d) navigating between positions of beacons as shown on said local area/facility maps, e) receiving local content, wherein said local content is determined based upon a location of said display device as identified by beacon identifiers of proximate beacons.

2. A method of personalizing delivery of content items according to claim 1 further comprising steps of:

(1) associating a user profile preference and said beacon identifier as a profile key wherein said profile key is transmitted in conjunction with a display device identifier, (2) determining a location of said display device using a proximity to said known location of RF beacons in said facility/area, wherein said known location of each RF beacon is provided by associating each beacon identifiers with a beacon location by at least one of embedding a description of said beacon location within said beacon identifier and associating each beacon identifier with each respective beacon location by an index, wherein in a condition having a single beacon signal received, the system determines the location by at least one of utilizing said location and beacon identifier association, and said location and beacon identifier association in conjunction with a signal strength of an RF signal emitted by said RF beacon, wherein in a condition having multiple beacons signal received, said location is determined by at least one of signal strength and a triangulation calculation, (3) decoding said profile key to obtain said user profile preference and said associated beacon identifier, and using said user profile preference and associated beacon identifier to determine at least one of: content delivery, marketing segments, and behavior, (4) delivering content to said user, wherein content is determined based upon said user profile preference and beacon identifier obtained from said decoded profile key, (5) presenting said content to said user by displaying said content on said display device when said display device is in a vicinity of said RF beacon.

3. The method according to claim 1, further comprising steps of:

obtaining at least one of: a facility map, an area map, an indoor image view, a GPS map and a floor plan, obtaining navigation content information wherein said navigation content is associated with an RF beacon identifier, and displaying said navigation content information over one of said facility map, said area map, said indoor image view, said GPS map or said floor plan on said display device, wherein said map contain waypoints of said known installed RF beacons.

4. The method according to claim 1, further comprising a step of providing a user of said display device with at least one indoor local base services application, wherein said at least one indoor local base services application includes at least one function selected from a list of functions comprising:

(1) obtaining a map and indoor navigation by downloading a local mall/store map from at least one of information provided by a directory stand and an Internet website prior to arriving at said facility area, wherein said map provides navigation between waypoints on said map, (2) obtaining a directory of at least one of a store and a mall as part of said local mapping downloads to said display device, (3) searching and locating at least one of a store, a place, an item, a product, wherein said at least one of said store, said place, said item, said product are associated with a list of said waypoints, (4) obtaining at least one of a discount, a sale, and a coupon, presenting said at least one of said discount, said sale, and said coupon and providing store aisle navigation upon said display device, wherein said store aisle navigation directs said user to a store aisle containing an items associated with said at least one of said discount, said sale, and said coupon, (5) determining available parking spaces in a vicinity of said display device and providing navigation to said user by displaying available parking spaces on said display device, (6) identifying a location of a parked car associated with said display device and providing navigation to return said user to said location of said parked car through a display on said display device, (7) obtaining and displaying location based information, wherein said location based information is at least one of an event, a restroom, an automated teller machine (ATM) location, a seating area, a playground, a fountain, and a public phone, wherein each of said at least one of the event, said restroom, said ATM location, said seating area, said playground, said fountain, and said public phone is located within a vicinity of said location of said display device, 8) obtaining emergency information and emergency navigation associated with said facility area, and displaying said emergency information and emergency navigation associated with said facility area on said display device, wherein said emergency navigation is based upon at least one of said location of said display device and said location of said RF beacon, (9) emitting a panic alert, wherein said panic alert requests being located in an emergency.

5. The method according to claim 1, further comprising a step of determining a current position of a user using a proximity of said display device to a known location of an RF beacon in said area/facility, by associating each beacon identifiers with a beacon location by at least one of embedding a description of said beacon location within said beacon identifier and associating each beacon identifier with each respective beacon location by an index, wherein in a condition having a single beacon signal received, the system determines the location by at least one of utilizing said location and beacon identifier association, and said location and beacon identifier association in conjunction with a signal strength of an RF signal emitted by said RF beacon, wherein in a condition having multiple beacons signal received, said location is determined by at least one of signal strength and a triangulation calculation.

6. The method according to claim 1, further comprising steps of delivering additional information associated with waypoints and providing real-time updates, wherein said additional information is at least one of: a store, a department, a schedule, a special sale, an event, and a coupon, and
displaying said additional information associated with waypoints on said display device.

7. The method according to claim 5, further comprising a step of navigating between waypoints using a GPS mapping in outdoor and at least one of a floor map and an image of said facility indoor, wherein said map comprising known waypoints can be downloaded for use with said mobile application.

8. The method according to claim 7, further comprising a step of performing said determining step indoor without aid of a global positioning satellite (GPS) system.

9. The method according to claim 1, further comprising a step of providing said display device with application software which provides guidance and navigation to a user by displaying information onto at least one of pre-loaded area maps and at least one of facility floor plans and indoor images of said facility.

10. The method according to claim 1, further comprising a step of providing navigation to a pedestrian within an environment within—a facility selected from a facility group consisting of: a mall, a department store, a specialty store, a conference, a trade show, an amusement park, a stadium, an arena, a sporting event, a university, a hospital, a school, a municipal building, a museum, a subway, a train station, an airport, a down town center, a financial banking location, a parking facility and a covered structure.

11. The method according to claim 1, further comprising at least one of:
a step of determining available empty parking spaces in a vicinity of said display device and providing navigation to a user by displaying available parking spaces on said display device, and
steps of identifying a location of a parked car associated with said display device and navigating said user to said location where said user parked their car through a display on said display device, thus providing a return to parking feature.

12. The method according to claim 1, further comprising a step of providing an indoor guide and navigation within one of: a museum, within a show, a conference, and an exhibition, wherein guide and navigation information is determined by an RF beacon identifier of said RF beacon located proximate to a location of said display device, wherein said guide and navigation is provided to a user by at least one of audio, video, and content information using said display device.

13. The method according to claim 1, further comprising a step of providing real estate information, identifying local property that is available for at least one of sale, lease, and rent, wherein said real estate information includes: a local guide, navigation specifically associated with real estate, and available local property, wherein said real estate information is determined based upon said location of at least one of said display device and said location of said RF beacon.

14. The method according to claim 1, further comprising steps of providing guidance and navigation associated with an amusement park having waypoints identifying specific points of interest within said amusement park, and
displaying information associated with said amusement park including at least one of a schedule of show, wait times for a show, time to said show, a restroom location, a food service area and a process for reducing a wait time for access to a show or attraction.

15. The method according to claim 1, further comprising a step of providing navigation for an emergency exit route utilizing a location of at least one of said display device and said location of said proximate RF beacon within said facility area to determine said emergency exit route and providing updated guidance for directing a user to safely exit said facility area.

16. The method according to claim 1, further comprising steps of:
providing a user with a current location of at least one of: —a train, a bus and a subway train on a route directly to said display device, wherein said current location of at least one of said train, said bus, and said subway train is displayed upon a train/subway/underground map,
presenting the display device location in said route, and
presenting additional information including at least one of a schedule, a restroom location, a food serving location, and an emergency route, wherein said additional information is determined by said RF beacon identifier of said RF beacon located proximate to said display device.

17. The method according to claim 1, further comprising a step of obtaining and displaying road sign locations upon a local map collectively displayed upon one of said display device, a vehicle display, wherein said road sign locations are determined by said RF beacon identifier of said RF beacon located proximate to said display device, wherein information is provided through an interface between said display device and a vehicle computer operating said vehicle display, and
a step of alerting a driver to adjust a speed of a vehicle in accordance with speed signs located within a vicinity of said display device.

18. The method according to claim 1, further comprising steps of:
f) storing information about customer behavior habit without compromising user ID or privacy,
g) providing a location based service (LBS) application and information contents based on at least one of a location of a user as determined by at least one of said location of said display device and said location associated with said RF beacon identifier, and a behavior habit obtained from said display device, and a profile preference provided by data obtained from said display device, wherein said LBS and information content comprises at least one of: a special, a sale, and a promotion events coupon,
h) designating a business as a waypoint and presenting advertisements associated with the business on the display device.

19. The method according to claim 1, wherein said display device overlay image is illustrated as a series of concentrically arranged circles.

20. The method according to claim 1, wherein said display device further provides a functionality of an RF beacon.

* * * * *